United States Patent [19]

Hanson et al.

[11] 4,433,374
[45] Feb. 21, 1984

[54] CACHE/DISK SUBSYSTEM WITH CACHE BYPASS

[75] Inventors: Merlin L. Hanson, Arden Hills; Robert E. Swenson, Mendota Heights; Arnold R. Schmalzbauer, Minneapolis, all of Minn.

[73] Assignee: Sperry Corporation, New York, N.Y.

[21] Appl. No.: 207,091

[22] Filed: Nov. 14, 1980

[51] Int. Cl.³ .............................................. G06F 7/02
[52] U.S. Cl. ....................................................... 364/200
[58] Field of Search ... 364/200 MS File, 900 MS File

[56] References Cited

U.S. PATENT DOCUMENTS

| | | | |
|---|---|---|---|
| 3,938,097 | 2/1976 | Niguette | 364/200 |
| 4,079,234 | 3/1978 | Kashio | 264/900 |
| 4,186,438 | 1/1980 | Benson et al. | 364/200 |
| 4,189,770 | 2/1980 | Gannon et al. | 364/200 |
| 4,228,496 | 10/1980 | Katzman et al. | 364/200 |
| 4,245,304 | 1/1981 | Porter et al. | 364/200 |
| 4,264,953 | 4/1981 | Douglas et al. | 364/200 |
| 4,268,907 | 5/1981 | Porter et al. | 364/200 |
| 4,317,168 | 2/1982 | Messina et al. | 364/200 |
| 4,322,795 | 3/1982 | Lange et al. | 364/200 |
| 4,354,232 | 10/1982 | Ryan | 364/200 |
| 4,371,929 | 2/1983 | Beann et al. | 364/200 |

*Primary Examiner*—Jerry Smith
*Assistant Examiner*—Gary V. Harkcom

*Attorney, Agent, or Firm*—Griffin, Branigan & Butler

[57] ABSTRACT

In a data processing system having a host processor, a cache store for storing segments of data, a bulk memory and a storage control unit for controlling transfers between the processor, cache store and bulk memory, the storage control unit normally responds to a read or write command from the host processor to control the transfer of data. If a copy of the data transferred is not resident in the cache store then a copy is written therein by the storage control unit. If the length of a data transfer exceeds a first threshold length then the storage control unit does not write a copy of the data into the cache store. If the length of a data transfer exceeds a second threshold length, and the transfer begins on a segment boundary and comprises an integral number of segments, then the storage control unit does not write a copy of the data into the cache store. The writing into the cache store is transparent to the host processor. The use of a transfer threshold prevents data from being entered into the cache store when it is not likely to be used again soon. Two thresholds are provided because the data transferred in long transfers of an integral number of segments is even less likely to be used again soon than the data transferred in long transfers that do not begin on a segment boundary or comprise an integral number of segments.

7 Claims, 1 Drawing Figure

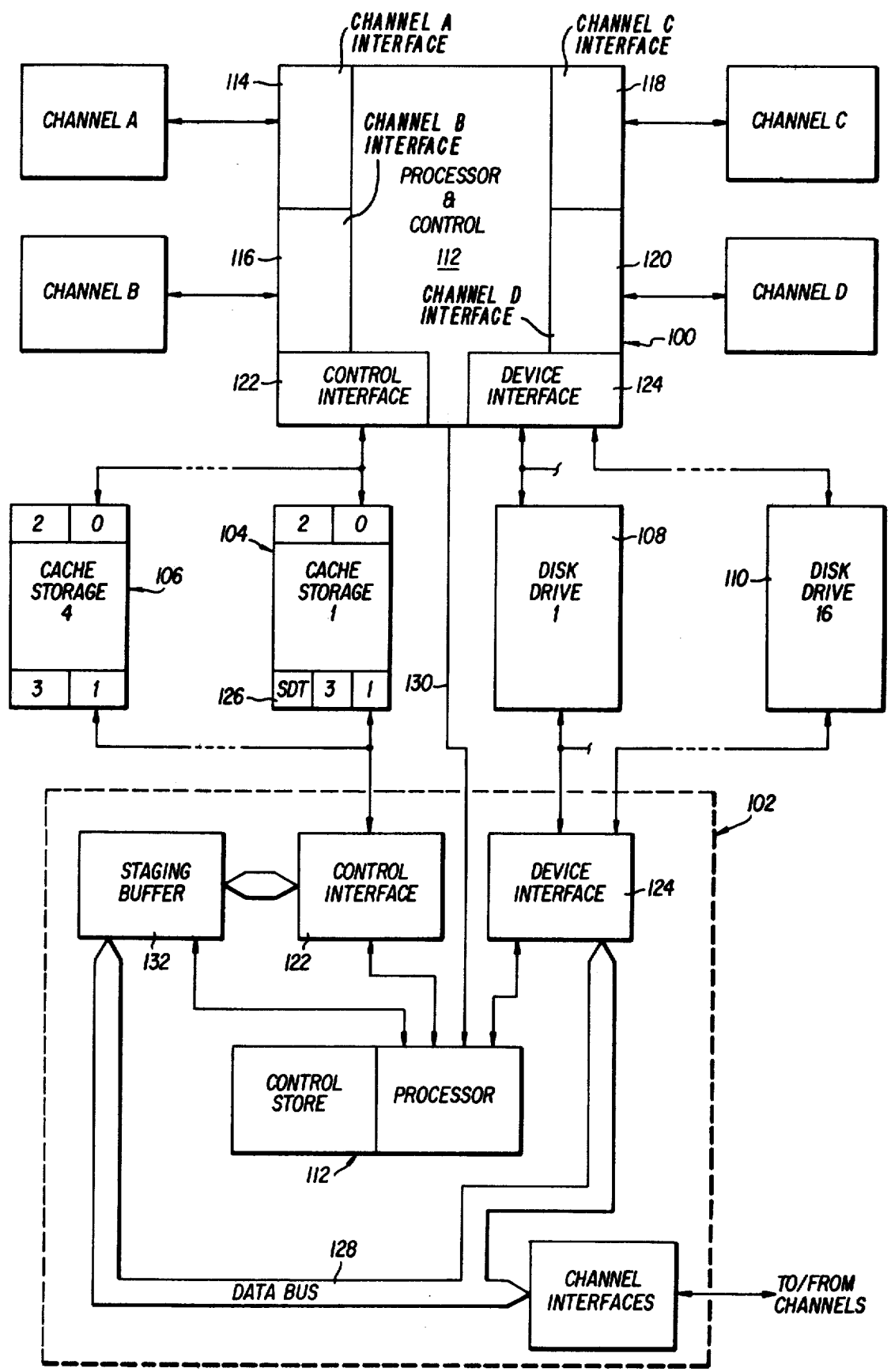

CACHE/DISK SUBSYSTEM WITH CACHE BYPASS

RELATED APPLICATIONS

This application relates to concurrently field applications Ser. Nos. 207,152, now U.S. Pat. No. 4,394,733, and 207,097, now U.S. Pat. No. 4,394,732, both assigned to the same assignee as the present application. The disclosure of these applications are incorporated herein by reference.

BACKGROUND OF THE INVENTION

The present invention relates to a data processing system and more particularly to a cache/disk subsystem wherein a storage control unit is disposed in the system intermediate a host processor, a cache store and a plurality of disk drive devices to control the transfer of data between the host processor, cache store and the disk drive devices.

Application Ser. No. 207,152 discloses in detail a data processing system wherein a cache store stores segments of data which are copies of segments of data recorded on disks, or copies of data which must be written on the disk. The arrangement is such that when the host processor issues a command to transfer data between the processor and a disk, a copy of the data transferred is entered into the cache memory. The host processor specifies the disk space at which a commanded operation is to take place by specifying the starting address on the disk and the number of words to be transferred. A given command may specify a data transfer length of one word or many segments of words, each segment containing, typically, 1792 words. Since the storage control unit normally writes into the cache store a copy of the data transferred, it is obvious that for very long data transfers a large portion of any data in the cache store may be replaced with the data being transferred. This is undesirable because, statistically, it has been found that the data transferred during a long data transfer is not likely to be used again soon. Furthermore, statistics show that data transferred during very long data transfers that begin and end on segment boundaries is even less likely to be soon used again than data transferred during long data transfers that do not begin on a segment boundary or do not comprise an integral number of segments of data.

SUMMARY OF THE INVENTION

An object of the present invention is to provide a method and apparatus for bypassing a cache store when a host processor issues a command to a cache/disk subsystem defining a long data transfer, said method and apparatus accomplishing the bypass operation in a manner which is transparent to the host processor.

A further object of the invention is to provide a method and apparatus for bypassing a cache store when a host processor issues a command to a cache/disk subsystem, said method and apparatus providing a first or a second threshold transfer length above which data is not entered into the cache store, the arrangement being such that a data transfer length specified by the host processor command may be compared against one or both of the threshold transfer lengths depending upon whether or not the command specifies a transfer which begins on a segment boundary and extends for an integral number of segments.

An object of the present invention is to provide in a data processing system of the type having, a bulk memory having addressable space for storing data; a host processor for issuing commands, each command defining an operation to be performed and specifying the starting address and the length of the bulk memory space at which the operation is to be performed; a cache store for storing copies of segments of data which are stored in, or are to be stored in the bulk memory; and, a storage control unit connected to the host processor, the bulk memory and the cache store and responsive to commands from the host processor for controlling the transfer of data between the host processor, the bulk memory, and the cache store, the storage control unit being normally operative in response to a given command from the host processor defining a transfer of data between the host processor and the bulk memory for writing a copy of the data in the cache store, the improvement comprising: storage means for storing a bypass value indicative of the maximum number of segments which may be written into the cache store in response to the given command; first comparing means in the storage control unit for comparing the bypass value with the length of bulk memory space specified by the given command; and means in the storage control unit responsive to the comparing means for inhibiting the writing of data into the cache store in response to the given command if the comparison indicates that the bypass value is less than the length of bulk memory space specified by the command.

An object of the present invention is to provide a data processing system as described above wherein: the command issued by the host processor specifies the starting address and the number of words to be transferred, the storage control unit including converting means for converting the specifies number of words to a converted value specifying the number of segments involved in the transfer, the comparing means comprising means responsive to the converting means for comparing the converted value with the bypass value to inhibit the writing of data into the cache store if the converted value is greater than the bypass value.

A further object of the invention is to provide a data processing system as described above wherein the bulk memory comprises at least one disk on which data is recorded by segments, the storage means includes means for storing a second bypass value indicative of a second maximum number of segments which may be written into the cache store in response to the given command; and the storage control unit includes, means for determining if the given command specifies bulk memory space having a starting address which begins on a segment boundary and a length equal to an integral number of segments; second comparing means responsive to the means for determining, the conversion means and the second bypass value for comparing the converted value with the second bypass value only if the given command specifies bulk memory space having a starting address which begins on a segment boundary and a length equal to an integral number of segments, the second comparing means including means producing an output signal if the second bypass value is less than the converted value; and, means responsive to the output signal for inhibiting the first comparing means and the writing of data into the cache store in response to the given command.

An object of the present invention is to provide a method of operating a data processing system of the type including a bulk memory having addressable space for storing data, a host processor for issuing commands, each command defining an operation to be performed and specifying the starting address and the length of the bulk memory space at which the operation is to be performed, a cache store for storing copies of segments of data which are stored in, or are to be stored in the bulk memory, storage means for storing variables, and a storage control unit connected to the bulk memory, the host processor, the cache store and the storage means and responsive to a given command from the host processor for controlling the transfer of data between the host processor, the bulk memory and the cache store, the storage control unit being normally operative in response to the given command from the host processor defining a transfer of data between the host processor and the bulk memory for writing a copy of said transferred data in the cache store, the method comprising: creating a first variable representing a first theshold data transfer length, the first threshold length defining the maximum number of segments in the cache memory which may be written in response to the given command; comparing the first variable with the length of bulk memory space specified by the given command; and, inhibiting the writing of a copy of the transferred data into the cache store if the first threshold data transfer length is less than the length of bulk memory space specified by the given command whereby the cache store is not filled with data which is not likely to be soon used again.

Other objects of the invention and its mode of operation will become apparent from the following description and the accompanying drawing.

BRIEF DESCRIPTION OF THE DRAWINGS

The single FIGURE is a given block diagram of a cache/disk subsystem.

DETAILED DESCRIPTION OF THE INVENTION

As illustrated in the drawing, a cache/disk subsystem comprises first and second storage control units 100, 102, a cache store comprising one or more cache storage units 104, 106, a bulk memory comprising a plurality of disk drives 108, 110 for driving storage disks, and a plurality of channel units A-D for connecting the storage control units to one or more host processors (not shown).

As illustrated in storage control unit 102, each storage control unit includes a processor and control store 112, a staging buffer 132 and interface circuits for interfacing with the disk drive devices and the channel unit.

As explained in detail in application Ser. No. 207,152, a host processor issues commands through a channel unit to the storage control unit when the host processor wishes to read data from, or transfer data to, one of the disk drive devices. A command issued by the host processor defines the operation to be performed and specifies the starting address of as well as the length (number of words) of the disk space at which the operation is to be performed.

Data in the cache store and on the disks is managed by segments. The cache store stores copies of segments of data which have recently been read from the disks to a host processor or sent to the storage control unit by a host processor for writing onto the disks. A segment descriptor table 126 has an entry therein for each segment of data in the cache store and by utilizing the segment descriptor table a storage control unit may determine whether or not a copy of the data from the disk space specified by a host processor command is resident in the cache store.

Normally, when a host processor issues a Normal Read or Normal Write command to a storage control unit, the storage control unit checks the segment descriptor table to see if a copy of the data from the disk space specified by the command is resident in the cache store. If it is, the storage control unit controls the transfer of the data between the cache store and the host processor.

If a command is a Normal Read command and a copy of the data from one or more segments of the disk space specified by the command is not resident in the cache store, the data is read from the disk to staging buffer 132 and then to the host processor via data bus 128 and a channel interface. If a copy of the data from one or more segments of the specified disk space is resident in the cache store then these segments are transferred to the host processor through the staging buffer instead of the corresponding segment of data from the disk. Copies of all segments of data transferred to the host processor are entered into the cache store.

If the command is a Normal Write command, the data from the host is written into the cache store. If the specified transfer does not begin on a segment boundary the first segment of data is read from the disk if it is not resident in the cache store, or read from the cache store if it is resident therein. The segment is overwritten in the staging buffer with the data from the host processor and the result returned to the cache store. The last segment is treated in the same manner as the first segment.

In the write operations described above, the data is not written to the disk under the control of the processor which issued the command. The storage control unit controls the subsequent transfer of "written-to" segments from the cache store to the disks at a time which is more convenient for the storage control unit. This operation is described in application Ser. No. 207,097.

The host processor may also issue an Acquire Write, Store Thru, Dispersed Read or Dispersed Write command.

An Acquire Write command is issued by the host processor when it knows that the write operation is the first access of the specified disk space hence there is no need to perform a pre-write read from the disk as is done with some Normal Write commands. The data is transferred from the host processor through the storage control unit to the cache store.

A Store Thru command is a form of write command issued by a host processor when it is imperative that the data be written onto a disk as soon as possible. The data entry into the cache store is the same as for a Normal Write command but the storage control unit issues a seek to a disk drive so that the data may also be written onto a disk.

Dispersed Read and Dispersed Write commands bypass the cache store and transfer data from the disk to the host processor, or from the host processor to the disk.

When a Normal Read, Normal Write, Acquire Write or Store Thru command specifies a long disk space, the segments of the data transferred are entered into the cache store and tend to fill it. The purpose of the cache store is to hold data which most likely will be used soon.

On the other hand, it has been found that extremely long data transfers usually involve data that is not likely to be used again soon. Furthermore, statistics show that long data transfers which begin and end on segment boundaries usually relate to data which is even less likely to be used than data in long transfers that do not begin and end on segment boundaries. In recognition of this fact, the system is provided with two threshold variables designated Bypass 1 and Bypass 2. A Parameterize command loads the variables into a variable store which stores the segment descriptor table 126 at the time the system is parameterized. Bypass 1 is used as a threshold value for transfers which do not begin and end on segment boundaries and Bypass 2 is used as a threshold value for segments which do begin and end on segment boundaries.

As explained with reference to FIG. 69 of application Ser. No. 207,152, the length of data transfer specified by a command from a host processor is converted into a number NSEG representing the number of segments (or partial segments) involved in the transfer, this conversion being done by the storage control unit. Subsequently, the storage control unit executes a Cache Command Breakout routine as described with reference to FIGS. 70A-70D of that application. During that routine, the storage control unit tests the command received from the host processor to determine which of the following conditions it meets.

a. is it an Acquire Write command?
b. is it a Dispersed Read, Dispersed Write, Store Thru, or Normal Read command?
c. does the transfer start on a segment boundary?
d. does the transfer involve a transfer of an integral number of segments?

If the command is an Acquire Write command, or is a command other than a Normal Read, Store Thru, or Dispersed command, begins on a segment boundary and involves a disk space which is an integral number of segments, NSEG is compared with Bypass 2. If Bypass 2 is less than NSEG, the command is converted to a dispersed mode command which, as explained above, bypasses the cache store and prevents the data being transferred between the host processor and disk from being copied into the cache store.

If the command is not an Acquire Write, Dispersed Read or Dispersed Write command and is not a Normal Read or Store Thru command that begins on a segment boundary and involves an integral number of segments or if it is a Normal Read or Store Thru command that does begin on a segment boundary and involve an integral number of segments but NSEG is less than Bypass 2, then NSEG is compared with Bypass 1. If Bypass 1 is less than NSEG then the command is converted to a dispersed mode command (read or write) to bypass the cache store.

If NSEG is less than both Bypass 1 and Bypass 2 then the command is handled by the storage control unit in the normal way with copies of any transferred data being entered into the cache store.

Reference may be made to application Ser. No. 207,152 for a complete description of the data processing system illustrated in FIG. 1 herein, and to the description in that application relating to FIGS. 70A-70D for a full description of how the bypass threshold values are checked during the Cache Command Decode routine.

We claim:

1. In a data processing system of the type having, a bulk memory having addressable space for storing data;
a host processor for issuing read or write commands, each command defining an operation to be performed and specifying the starting address and the length of the bulk memory space at which said operation is to be performed;
A cache store for storing copies of segments of data which are stored in, or are to be stored in said bulk memory; and,
a storage control unit connected to said host processor, said bulk memory and said cache store and responsive to commands from said host processor for controlling the transfer of data between said host processor, said bulk memory, and said cache store,
said storage control unit being normally operative in response to any given one of said commands issued from said host processor defining a transfer of data between said host processor and said bulk memory for writing a copy of said data in said cache store,
the improvement comprising:
storage means for storing a bypass value indicative of the maximum number of segments which may be written into said cache store in response to any of said commands;
first comparing means in said storage control unit for comparing said bypass value with the length of bulk memory space specified by said given command prior to the transfer of any data between said bulk memory and said host processor;
means in said storage control unit responsive to said comparing means for inhibiting the writing of data into said cache store in response to said given command if said comparison indicates that said bypass value is less than the length of bulk memory space specified by said given command; and,
means in said storage control unit responsive to said comparing means for writing into said cache store a copy of the data specified by said given command if said comparison indicates that said bypass value is greater than the length of bulk memory space specified by said given command.

2. A data processing system as claimed in claim 3 wherein:

the given command issued by said host processor specifies the starting address and the number of words to be transferred,
said storage control unit including converting means for converting the specified number of words to a converted value specifying the number of segments involved in the transfer,
said comparing means comprising means responsive to said converting means for comparing said converted value with said bypass value to inhibit the writing of data into said cache store if said converted value is greater than said bypass value.

3. A data processing system as claimed in claim 2 wherein said bulk memory comprises at least one disk on which data is recorded by segments,
said storage means includes means for storing a second bypass value indicative of a second maximum number of segments which may be written into in said cache store in response to said given command; and
said storage control unit includes, means for determining if said given command specifies bulk memory space having a starting address which begins on a segment boundary and a length equal to an integral number of segments;

second comparing means responsive to said means for determining, said conversion means and said second bypass value for comparing said converted value with said second bypass value only if said given command specifies bulk memory space having a starting address which begins on a segment boundary and a length equal to an integral number of segments, said second comparing means including means producing an output signal if said bypass value is less than said converted value; and, means responsive to said output signal for inhibiting said first comparing means and the writing of data into said cache store in response to said given command.

4. In a data processing system including a bulk memory having addressable space for storing data, a host processor for issuing read or write commands, each command defining an operation to be performed and specifying the starting address and the length of the bulk memory space at which said operation is to be performed, a cache store for storing copies of segments of data which are stored in, or are to be stored in said bulk memory, storage means for storing variables, and a storage control unit connected to said bulk memory, said host processor, said cache store and said storage means and responsive to any given one of said commands issued from said host processor for controlling the transfer of data between said host processor, said bulk memory and said cache store, said storage control unit being normally operative in response to said given command from said host processor defining a transfer of data between said host processor and said bulk memory for writing a copy of said transferred data in said cache store, the method of preventing the filling of said cache store with data which is not likely to be soon used again, said method comprising:

creating a first variable representing a first theshold data transfer length, said first threshold length defining the maximum number of segments in said cache memory which may be written in response to any of said commands;

comparing said first variable with the length of bulk memory space specified by said given command prior to the transfer of any data between the bulk memory and the host processor;

inhibiting the writing of a copy of said transferred data into said cache store if said first threshold data transfer length is less than the length of bulk memory space specified by said given command; and, writing a copy of said transferred data into said cache store if said first threshold data transfer length is greater than the length of bulk memory space specified by said given command.

5. A method as claimed in claim 4 wherein the length of bulk memory space specified by said given command is specified as a number of words, said method further comprising:

converting said specified number of words to a value representing an equivalent number of segments, a segment comprising an integral number of words; and, said comparing comprising comparing said variable with said value representing an equivalent number of segments.

6. A method as claimed in claim 5 and further comprising:

creating a second variable representing a second threshold data transfer length, said second threshold length defining a second maximum number of segments in said cache memory which may be written to in response to said given command;

determining from said cache command if said specified bulk memory space comprises an integral number of segments and starts at a segment boundary;

comparing said second variable with said value representing an equivalent number of words if it is determined that said specified bulk memory space begins on a segment boundary and comprises an integral number of segments; and, inhibiting the writing of a copy of said transferred data into said cache store if the comparison of said second variable with said value representing an equivalent number of words indicates that said second threshold data transfer length is less than the length of bulk memory space specified by said given command.

7. A method as claimed in claim 6 wherein the step of comparing said first variable with said value representing an equivalent number of segments is not executed if the comparison of said second variable with said value representing an equivalent number of segments indicates that said second threshold data transfer length is less than the length of bulk memory space specified by said given command, whereby one threshold is employed to inhibit writing data into said cache store if the bulk memory space specified in said given command begins on a segment boundary and comprises an integral number of segments, and a second threshold is employed to inhibit writing data into said cache store if the bulk memory space specified in said given command does not begin on a segment boundary or does not comprise an integral number of segments.

* * * * *

UNITED STATES PATENT AND TRADEMARK OFFICE
CERTIFICATE OF CORRECTION

PATENT NO. : 4,433,374

DATED : February 21, 1984

INVENTOR(S) : Merlin L. Hanson, Robert E. Swenson, Arnold R. Schmalzbauer

It is certified that error appears in the above-identified patent and that said Letters Patent are hereby corrected as shown below:

Column 6, Line 45, "3" should be -- 1 -- .

Signed and Sealed this

First Day of May 1984

[SEAL]

Attest:

Attesting Officer

GERALD J. MOSSINGHOFF

Commissioner of Patents and Trademarks